(12) United States Patent
Lovell

(10) Patent No.: US 9,928,714 B1
(45) Date of Patent: Mar. 27, 2018

(54) PROGRAMMABLE CHILD POSITIONING AND TRACKING DEVICE

(71) Applicant: Jens Lovell, Pioria, AZ (US)

(72) Inventor: Jens Lovell, Pioria, AZ (US)

( * ) Notice: Subject to any disclaimer, the term of this patent is extended or adjusted under 35 U.S.C. 154(b) by 0 days.

(21) Appl. No.: 15/280,929

(22) Filed: Sep. 29, 2016

(51) Int. Cl.
*G08B 25/00* (2006.01)
*G08B 21/02* (2006.01)
*H04B 1/3827* (2015.01)

(52) U.S. Cl.
CPC ....... *G08B 21/0269* (2013.01); *G08B 21/028* (2013.01); *G08B 21/0286* (2013.01); *H04B 1/385* (2013.01); *G08B 21/0291* (2013.01); *H04B 2001/3861* (2013.01)

(58) Field of Classification Search
CPC ................................ H04W 4/02; H04W 4/025
USPC ......... 455/456.3, 456.6; 340/539.15
See application file for complete search history.

(56) References Cited

U.S. PATENT DOCUMENTS

| | | | | |
|---|---|---|---|---|
| 6,239,715 B1* | 5/2001 | Belton | ............... | G08B 21/0216 340/471 |
| 6,388,612 B1* | 5/2002 | Neher | ................... | G01S 5/0018 224/164 |
| 2005/0020274 A1* | 1/2005 | Ursini | ................ | G08B 21/0202 455/456.1 |
| 2010/0267361 A1* | 10/2010 | Sullivan | ................. | G01S 19/17 455/404.2 |
| 2010/0302914 A1* | 12/2010 | Faucher | ................ | A44C 5/147 368/282 |
| 2015/0109126 A1* | 4/2015 | Crawford | ........... | G08B 21/0269 340/539.13 |

\* cited by examiner

*Primary Examiner* — Kevin Kim
(74) *Attorney, Agent, or Firm* — Steven Rinehart

(57) ABSTRACT

A child tracking bracelet includes a bangle, and a body or locking mechanism which locks the bangle in place. The body is provided with a GPS positioning chip allowing a parent or guardian to track the location of a child bearing the bracelet if the child becomes lost. In some embodiments, the body comprises a receiver, a transceiver, and/or a speaker. The tracking bracelet, in some embodiments, is programmable to emit an alert when a child wanders beyond a determined distance from a separate device or when the bracelet is cut or removed. The GPS positioning chip is in logical connectivity with a control circuit, and powered by a battery. The specific position of a child can be accurately determined. The bracelet may be alternatively locked to an ankle, backpack, or the like.

7 Claims, 6 Drawing Sheets

PROGRAMMABLE CHILD POSITIONING AND TRACKING DEVICE

FIELD OF THE INVENTION

This invention relates to security devices for children, and more particularly relates to a tracking bracelet for children using global positioning technology (GPS).

BACKGROUND

Description of the Related Art

Smart wearable devices have proliferated in recent years, including smart phones, smart watches, smart homes, and the like. Many of these devices comprises GPS tracking means, but there exists no efficient means in the art of tracking a child's whereabouts by a guardian or parent when that child becomes lost. Smart phones and cellular devices can be misplaced by children, and devices provided with audible alarms are effective only within earshot. There exists a need in the industry for a device which can wirelessly locate from any distance a lost child upon request, which can relay a signal informing a parent or guardian of the child's geostatic location and which cannot be misplaced by the child. A device which overcomes these inefficiencies is desirable.

SUMMARY

From the foregoing discussion, it should be apparent that a need exists for an improved surgical ligation clip. Beneficially, such a device would overcome inefficiencies with the prior art by providing a child positioning and tracking bracelet which overcomes these difficulties.

The present invention has been developed in response to the present state of the art, and in particular, in response to the problems and needs in the art that have not yet been fully solved by currently available apparti. Accordingly, the present invention has been developed to provide a portable child tracking bracelet, the bracelet comprising: a bangle for circumscribing the wrist of a child, the bangle defining a series of regularly-spaced latching recesses; a housing defining a hollow recess affixed to a proximal end of the bangle, the housing defining a channel for receiving a distal end of the bangle; means for locking the distal end of the bangle in place within the channel; a GPS positioning chip for receiving GPS satellite data; a battery; a depressible button for activating a transmitter; and a transmitter for transmitting an emergency alert comprising geostatic positioning data received by the GPS positioning chip.

The bangle may further comprise a plurality of flexible conductive wires closing an electrical circuit such that if any of the flexible conductive wires are cut, the electrical circuit is broken and a transmitter within the housing activated.

The tracking bracelet may further comprise a plurality of tumblers for receiving a key, the tumblers configured to unlock the distal end of the bangle from the housing. The tracking bracelet may further comprise a GUI interface on an upper exterior surface of the housing.

The tracking bracelet, in some embodiments, further comprises a plurality of sensors for sensing moisture.

A second portable child tracking bracelet is provided, the bracelet comprising: a bangle for circumscribing the wrist of a child, the bangle defining a series of regularly-spaced latching recesses for receiving a locking ring; a plurality of locking rings, each locking ring affixed to the bangle within a latching recess, each locking ring having an open top surface and an open bottom surface, each latching ring defining an aperture traversing the locking ring longitudinally between open ends; a housing defining a hollow recess affixed to the bangle, the housing comprising: a GPS positioning chip for receiving GPS satellite data; a battery; a depressible button for activating a transmitter; and a transmitter for transmitting an emergency alert comprising geostatic positioning data received by the GPS positioning chip; a locking mechanism disposed at one end of the bangle, the locking mechanism defining a hollow recess traversing the locking mechanism from one side to another for receiving an opposing end of the bangle; wherein the locking mechanism is adapted to insert a piston into an aperture on a locking ring, which locking mechanism is locked with a key using a keyway accessible on an outer surface of the locking mechanism.

The bangle may consist of silicon. The tracking bracelet may further comprise a GUI interface on an upper exterior surface of the housing for interfacing with a user. The tracking bracelet may also further comprise a plurality of sensors for sensing moisture interconnected to a processor via a signal-bearing medium.

The bangle may further comprise a plurality of flexible conductive wires closing an electrical circuit such that if any of the flexible conductive wires are cut, the electrical circuit is broken and a transmitter within the housing activated. The bangle, in some embodiments, further comprises an electrical-to-acoustic inducer.

The bangle may further comprise an acoustic-to-electrical inducer.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. The order in which a particular method occurs may or may not strictly adhere to the order of the corresponding steps shown.

Figure 1:
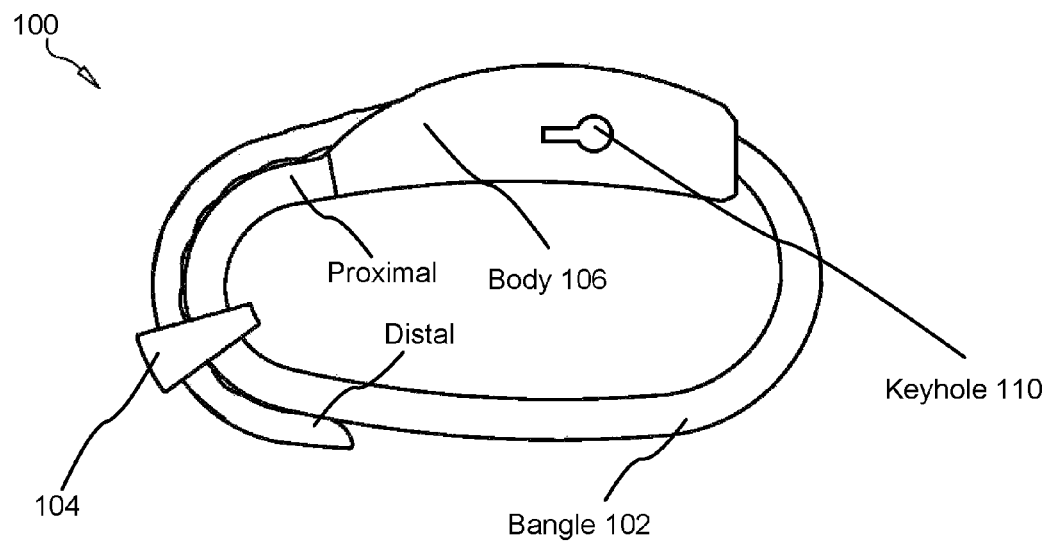
FIG. 1 is a side perspective view of a child positioning and tracking bracelet in accordance with the present invention.

FIG. 1 is a side perspective view of a child positioning and tracking bracelet in accordance with the present invention. The bracelet 100 comprises a body 106, a clasp 104, and a bangle 102.

The body 106 comprises means for achieving communication between the body 106 and a wireless data processing device (DPD) in wireless connectivity with the positioning device 100 via a WAN (wide are network).

The body 106 comprises a hollow housing for receiving electrical, electromechanical and mechanical components of the device 100. The body may comprise tracking receiver for receiving GPS data from a plurality of satellites and/or a signal from a DPD under the control or a parent or guardian prompting the device 100 to relay positioning information.

The bangle 102 may comprise a plurality of sensor and/or antennae circumscribing the bangle 102 exteriorly or interiorly. The sensors and antennae may oscillate on one or more frequencies may be configured to detect frequency shifts. The antennae may be coupled to a transmitter, receiver and/or transceiver which is configured to communicate frequency shifts to circuitry within the body 106 comprising a microcontroller or other similar device.

In various embodiments, the device 100 is configured to emit a wireless an alert when sensors in the bangle 102 are cut or damaged, including if the sensors become wet or detached from electrical connectivity with a circuit within the device 100.

In various embodiments, the device 100 is equipped with sensors for detecting the strength a magnetic field generating by an electromagnetic device in the possession of a parent or guardian, and activating an alert if the device 100 diverges outside a predetermined range (i.e., distance) from the electromagnetic device.

In various embodiments, the proximal end of the bangle 102 extends laterally from the body 106. In various embodiments, the bangle 102 is flexible and molded or otherwise fabricated from polymeric and/or metallic materials. The bangle 102 may be fabricated from organic materials, including wood, in unpreferred embodiments.

The distal end of the bangle 102 wraps around and reconnects with the body 106, which doubles in purpose as a clasp. The body 106 locks over the bangle 102 and locks the bangle 102 in place using means known to those of skill in the art. In various embodiments, the bangle 102 inserts through a recess or aperture in the body 106 which traverses the body 106 laterally.

The housing/body 106 may comprises a key latch mechanism and a keyhold 110 for receiving an inserted key and locking of unlocking the bangle 102. The keyhole 110 may disposed on a side of the body 106 or on an upper surface of the device 100.

Figure 2:
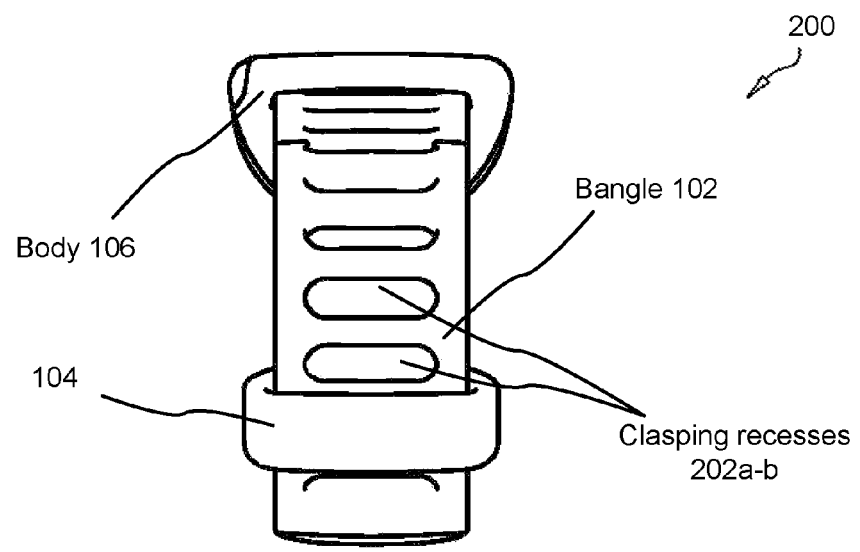
FIG. 2 is a rearward perspective view of a child positioning and tracking bracelet in accordance with the present invention.

FIG. 2 is a rearward perspective view of a child positioning and tracking bracelet 200 in accordance with the present invention. The bracelet 200 comprises a body 106 and a bangle 102. The bangle 102 defines a plurality of clasping recesses 202 spaces disposed at evenly-spaced intervals across the bangle 102 laterally.

The body 102 is configured to clamp down on these recesses 202 for the purpose of locking the body 106 in position on the bangle 102. In various embodiments, the bangle 102 may only be released from the body 106 with a key, a PIN, password entered electronically into a GUI on the body 106, or input received by a biometric sensor forming the body 106.

Figure 3:
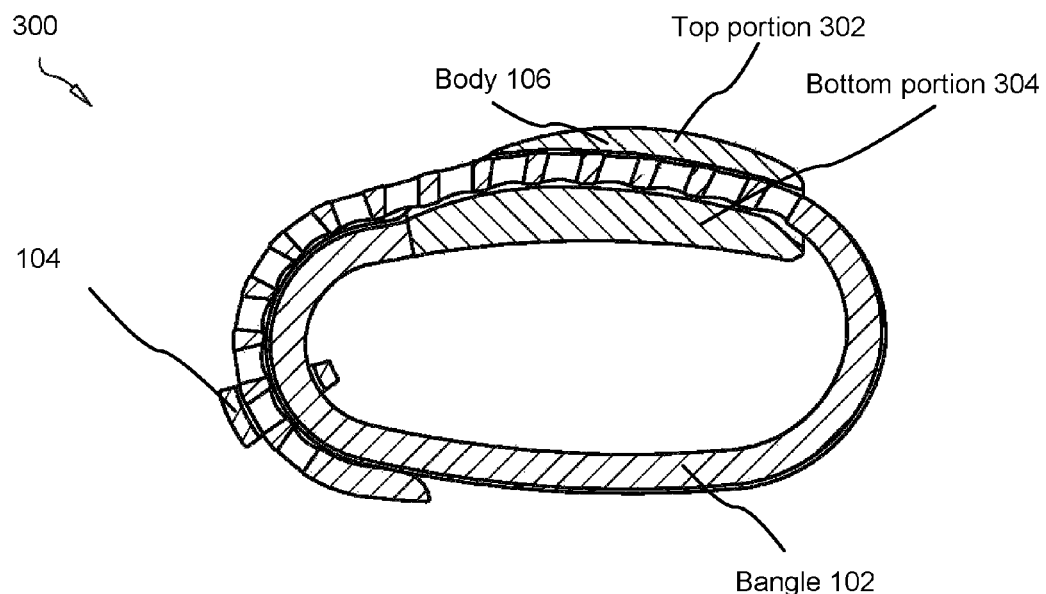
FIG. 3 is a cross-sectional side perspective view of a child positioning and tracking bracelet in accordance with the present invention.

FIG. 3 is a cross-sectional side perspective view of a child positioning and tracking bracelet 300 in accordance with the present invention.

As shown, the bangle 102 traverses the body 106 forward to back (i.e., rearward). The body 106 comprises a top portion 302 and a bottom portion 304. The top portion 302 and/or bottom portion 304 clamp down on, clasp, grip or lock the bangle 102 in place. In various embodiments, the top portion 302 and/or the bottom portion 304 are hingedly connected to the body 106. In other variations, the body 106 forms a channel or recess through which the bangle 102 travels and locks.

Figure 4:
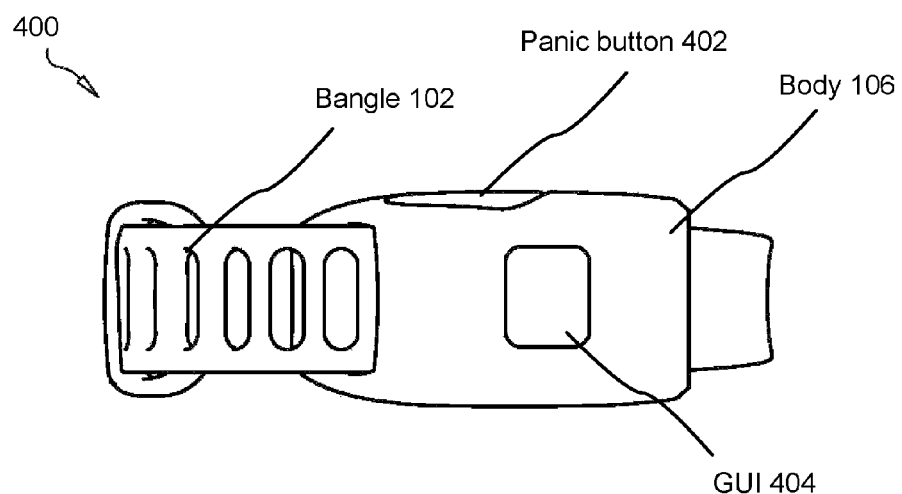
FIG. 4 is a top perspective view of a child positioning and tracking bracelet in accordance with the present invention.

FIG. 4 is a top perspective view of a child positioning and tracking bracelet 400 in accordance with the present invention.

The bracelet/device 400 comprises a panic button 402 in some embodiments. The panic button 402 comprises a depressible button disposed on the body 106, or positioned within a recess or aperture defined by the body 106. The panic button 402 may comprise an iron core coil, diodes; capacitors; resistor(s), and transistor(s) necessary to allow a child to push, depress or activate the panic button 402 thus emitting a wireless and/or audible emergency signal alerting a parent/guardian and/or others that the child wearing the device 400 is in danger.

The transmitter and other electrical and electromechanical components are powered by a lithium battery, lithium-ion, or other battery known to those of skill in the art. The battery may be rechargeable or replaceable, thereby extending the functional lifespan of the device 400.

The circuitry of the electrical components of the device 400 is plotted within the housing. The device 400 is designed such that any attempt to open the housing/body 106 or alter the circuitry will result in immediate transmission of an emergency alert from the device 400.

Figure 5:
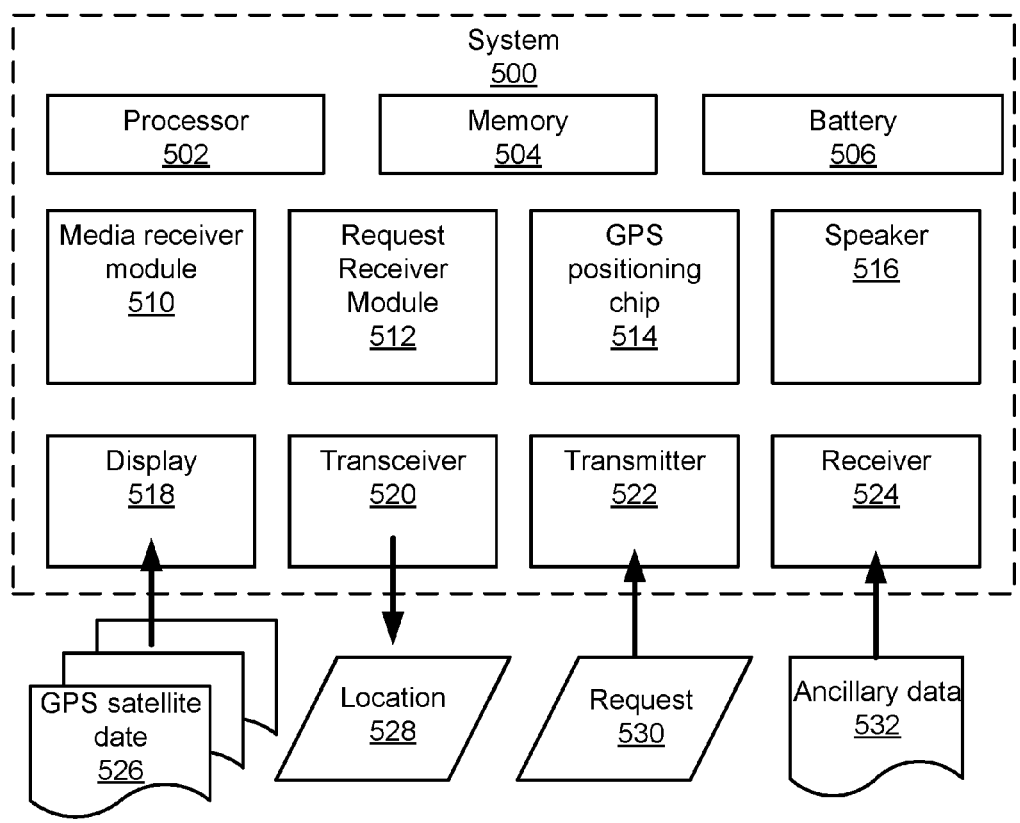
FIG. 5 is a block diagram of a system tracking a child in accordance with the present invention.

The device may comprise a graphical user interface for allowing the device 400 to be programmed. Programmable functions may include, in various embodiments, FIG. 5 is a block diagram of a system 500 tracking a child in accordance with the present invention.

The system 500 may be embodied within the body 106. The system 500 includes a conventional, battery-powered transmitter 522, receiver 524 and/or transceiver 520. The system 500 comprises a battery 506 as known to those of skill in the art, including lithium ion, and persistent computer readable memory 504.

The transmitter provides a transmitter signal having a predetermined frequency to the antenna embedded in either the bangle 102 and/or the body 106. Upon receipt of an instruction from the DPD under the control of the child's guardian, the device 100 using the system 500 may transmits an emergency signal. The system 500 may comprise an ELT (emergency locator transmitter) which my activated when one or more circuits traverses the bangle 106 are broken, or when the device 100 becomes wet or damaged.

The system includes five major components as shown: portable control means; and band adapted to be secured or strapped to the individual; transmitter means; trigger means; and portable receiver means. Preferably the transmitter means and trigger means 18 are incorporated in a wristwatch-like housing affixed to the band, thereby defining, in combination, a band unit, generally designated.

The band is preferably a nylon or injection-molded plastic strap, adjustable in length to accommodate various wrist or monitor a group of restricted individuals, thereby further reducing the overall cost of the system.

The processor 502 and computer readable memory 504 are known to those of skill in the art. The memory 504 comprises persistent, computer-readable memory. The battery 506 is known to those of skill in the art.

The media receiver module 510 may receive wireless transmitted media from a DPD under the control of a parent or guardian. The media may be transmitted in the form of a computer file, and may comprise audio, video, and/or images. The ancillary data 532 may consist of this computer file. In various embodiments, the media receiver module 510 displays the media on a GUI or display 518 integrated into the body 106.

The request receiver module 512 receives a digital request 530 for geostatic position from the DPD. The request 530 alternatively may form part of the ancillary data 532. The request receiver module 512 prompts or instructs the one of the transceiver 520 or transmitter 532 to transmit a geostatic GPS position 528 (i.e. location 528) derived from satellite data 526 received by the GPS positioning chip 514.

The GPS positioning chip 514 is known to those of skill in the art, as is a speaker 516 which is integrated into the system 500 and body 106 to render audio playback in various embodiments.

The receiver 524 may receive the ancillary data 532 and may comprise a wireless adapter.

Figure 6:
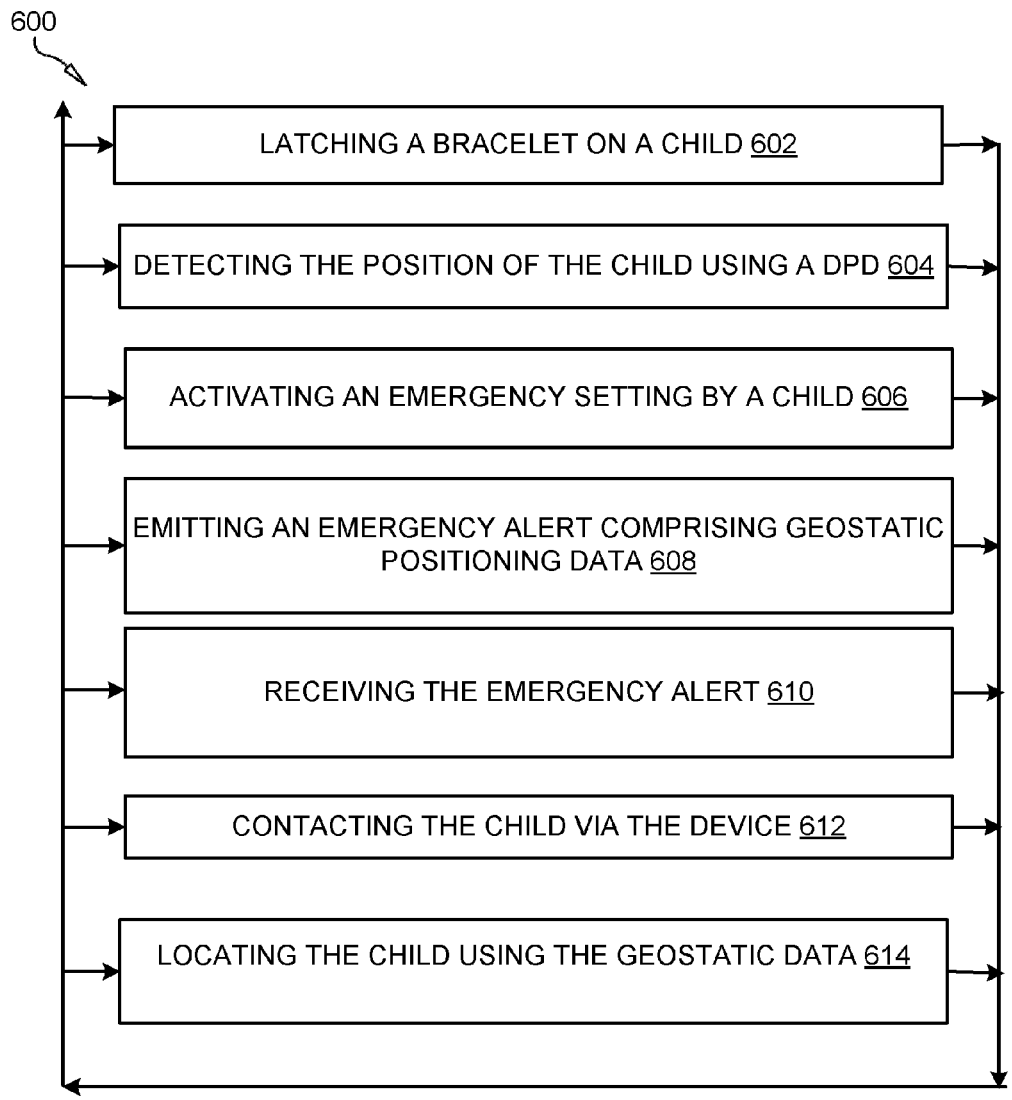
FIG. 6 is a flowchart for a method of tracking in accordance with the present invention.

FIG. 6 is a flowchart for a method of tracking in accordance with the present invention.

The first step 602 in the method 600 begins with latching 602, clasping, or locking a bracelet on a child, the bracelet comprises the electrical and electromechanical components necessary for receiving and relaying GPS information.

The method 600 progresses to detecting 604 a position of the child using GPS positioning information from satellites. In the third step 606 of the method 600 an emergency setting within the bracelet is activated manually by the child or automatically by any number of predetermined conditions, requisites or thresholds being met or satisfied, including the bracelet getting wet, being cut or destroyed, or the bracelet exceeding a predetermined and preprogrammed distance from a base electromagnetic field.

The emergency alert is received 601 by a DPD under the control of a parent or guardian who then contacts 612 the child using media relayed wireless via a WAN to the bracelet. GPS positioning information is relayed to the DPD and the child's current whereabouts are then ascertainable.

Figure 7A:
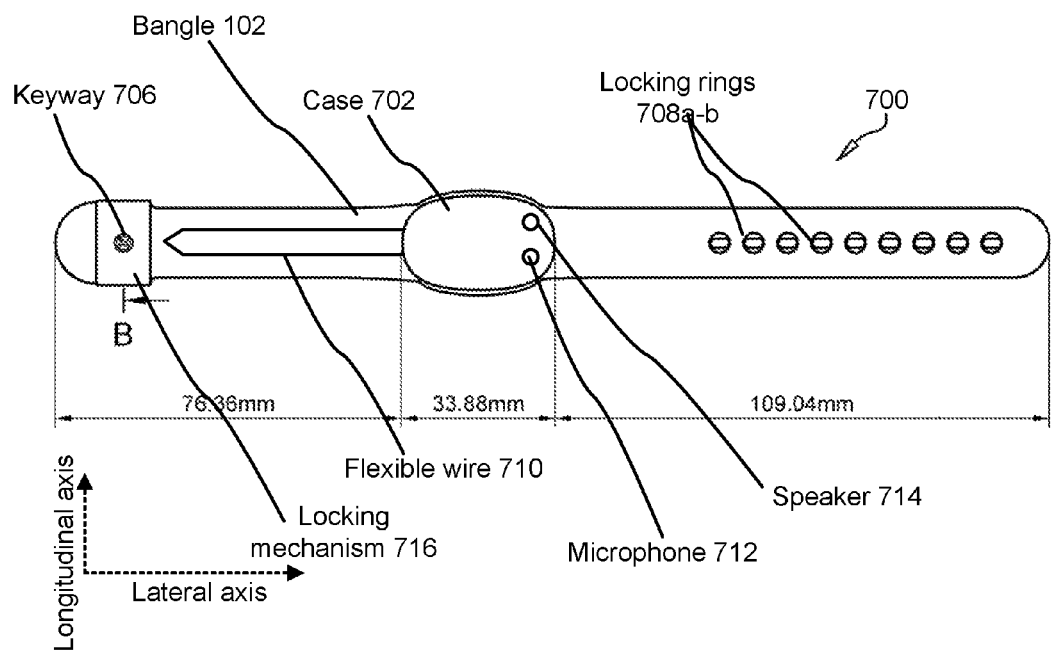
FIG. 7A is a top perspective view of a child positioning and tracking bracelet in accordance with the present invention.

FIG. 7A is a top perspective view of a child positioning and tracking bracelet in accordance with the present invention.

The housing 702 (the term "housing" is used synonymously with "case" herein) comprises the control circuitry necessary to facilitate interactivity between a manual user of the device (a child) and a remotely connected DPD using means known to those of skill in the art. The housing 702 may comprise means for relaying and receiving electrical signals enabling device-to-device oratory communication simultaneously.

In the shown embodiment, the vibrator 100 may be configured to make use of the Bluetooth® protocols and procedures enabling device-to-device intercommunication connectivity. The means for relaying and receiving electrical signals may be implemented in accordance with core specifications of one or more subsets of Bluetooth® profiles. The core specifications may comprise inter alia one or more of: the Cordless Telephony Profile (CTP), the Device ID Profile (DIP), the Dial-up Networking Profile (DUN), the File Transfer Profile (FTP), the Hands-Free Profile (HFP), the Human Interface Device Profile (HID), the Headset Profile (HSP), and the Intercom Profile (ICP), the Proximity Profile (MCP).

The microphone 712 may comprise an acoustic-to-electrical transducer configured to convert oratory sound from a user into an electrical signal for relay. The microphone 712 converts sound waves into a digital signal and is well-known to those of skill in the art. The microphone 712 facilitates verbal communication between a user of the device 700 and a remote user interfacing the device 700 via a WAN or LAN. The microphone 712 is in logical connectivity with a processor and a transmitter housed interiorly to the device 700. Using the microphone 712, a user making use of the device 700 can speak to the remote user.

In various embodiments, the bangle 102 comprises an elongated strip defining a plurality cylindrical recesses for receiving locking rings 708. The locking rings 708 may insert into the bangle 102 and are permanently affixed in place using means known to those of skill in the art, including heat pressing the locking rings (comprising lateral apertures for engaging the bangle 102) into the bangle 102.

The locking mechanism 716 is affixed to one end of the bangle 102. The locking mechanism 716 comprises a keyway 706 for receiving a key used to lock and unlock the bangle 102 on a child's wrist.

The locking mechanism 716 has two open lateral ends on the lateral axis. The locking mechanism 716 defines an aperture traversing the locking mechanism 716 on its lateral axis.

Figure 7B:
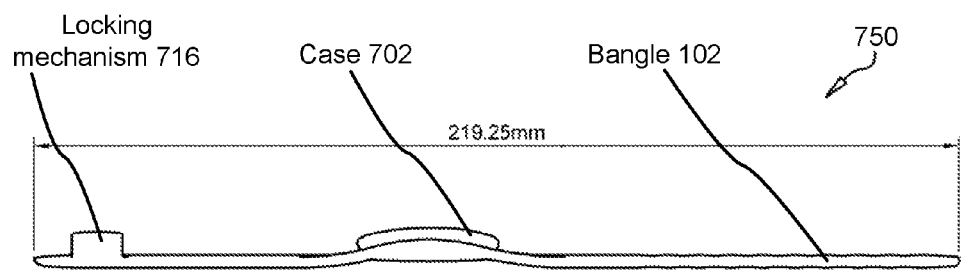
FIG. 7B is a side perspective view of a child positioning and tracking bracelet in accordance with the present invention.

FIG. 7B is a side perspective view of a child positioning and tracking bracelet in accordance with the present invention.

The locking mechanism 716 may be affixed to the bangle 102 using means known to those of skill in the art. The locking mechanism 716 may be affixed to the bangle 102

Figure 8:
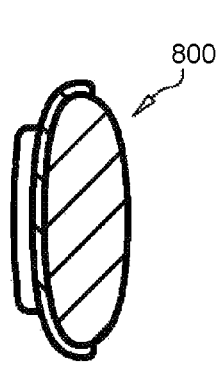
FIG. 8 is a forward perspective view of a child positioning and tracking bracelet in accordance with the present invention.

FIG. 8 is a forward perspective view of a child positioning and tracking bracelet in accordance with the present invention. FIG. 8 as shown.

Figure 9:
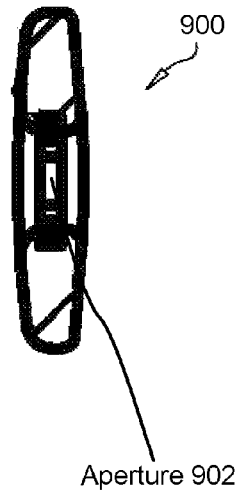
FIG. 9 is a side perspective view of a locking ring of a child positioning and tracking bracelet in accordance with the present invention.

FIG. 9 is a side perspective view of a locking ring 900 of a child positioning and tracking bracelet in accordance with the present invention. The locking ring 900 defines an aperture 902 for receiving a piston on the locking mechanism 716.

Figure 10:
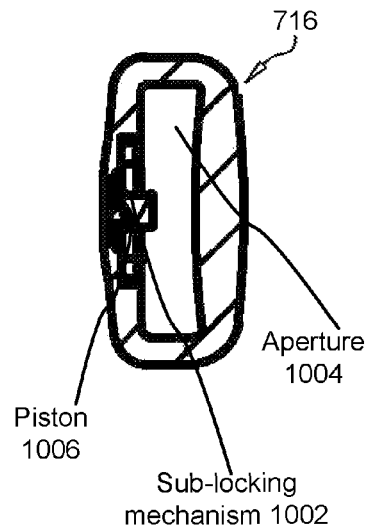
FIG. 10 is a side perspective view of a locking mechanism of a child positioning and tracking bracelet in accordance with the present invention.

FIG. 10 is a side perspective view of a locking mechanism of a child positioning and tracking bracelet in accordance with the present invention.

The locking mechanism 716 defines an aperture 1004 and comprises a sub-locking mechanism 1002 into which a key is inserted to lock and unlock the sub-locking mechanism using means known to those of skill in the art.

The sub-locking mechanism 716 comprises a piston 1006 which travels up and down on the longitudinal axis, interlocking with a locking ring 708.

Figure 11:
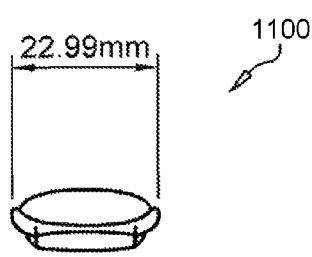
FIG. 11 is a forward perspective view of a housing of a child positioning and tracking bracelet in accordance with the present invention.

FIG. 11 is a forward perspective view of a housing of a child positioning and tracking bracelet in accordance with the present invention. FIG. 11 as shown.

Figure 12:
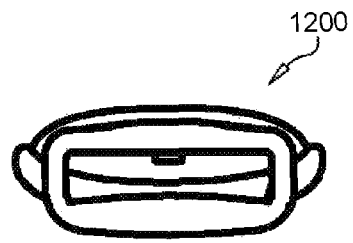
FIG. 12 is a side perspective view of a housing of a child positioning and tracking bracelet in accordance with the present invention.

FIG. 12 is a side perspective view of a housing of a child positioning and tracking bracelet in accordance with the present invention. The housing 1200 comprises open ends for receiving the bangle 102 in some embodiments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A portable child tracking bracelet, the bracelet comprising:
    a bangle for circumscribing the wrist of a child, the bangle defining a series of regularly-spaced latching recesses for receiving a locking ring;
    a plurality of locking rings, each locking ring affixed to the bangle within a latching recess, each locking ring having an open top surface and an open bottom surface, each latching ring defining an aperture traversing the locking ring longitudinally between open ends;
    a housing defining a hollow recess affixed to the bangle, the housing comprising:
        a GPS positioning chip for receiving GPS satellite data;
        a battery;
        a depressible button for activating a transmitter; and
        a transmitter for transmitting an emergency alert comprising geostatic positioning data received by the GPS positioning chip;
    a locking mechanism disposed at one end of the bangle, the locking mechanism defining a hollow recess traversing the locking mechanism from one side to another for receiving an opposing end of the bangle;
    wherein the locking mechanism is adapted to insert a piston into an aperture on a locking ring, which locking mechanism is locked with a key using a keyway accessible on an outer surface of the locking mechanism.

2. The tracking bracelet of claim 1, wherein the bangle consists of silicon.

3. The tracking bracelet of claim 1, further comprising a GUI interface on an upper exterior surface of the housing for interfacing with a user.

4. The tracking bracelet of claim 1, further comprising a plurality of sensors for sensing moisture interconnected to a processor via a signal-bearing medium.

5. The tracking bracelet of claim 1, wherein the bangle further comprises a plurality of flexible conductive wires closing an electrical circuit such that if any of the flexible conductive wires are cut, the electrical circuit is broken and a transmitter within the housing activated.

6. The tracking bracelet of claim 1, wherein the bangle further comprises an electrical-to-acoustic inducer.

7. The tracking bracelet of claim 1, wherein the bangle further comprises an acoustic-to-electrical inducer.

* * * * *